United States Patent
Ma et al.

(10) Patent No.: US 11,107,318 B2
(45) Date of Patent: Aug. 31, 2021

(54) DETECTING EXCLUDED PLAYERS AND RELATED SYSTEMS AND METHODS

(71) Applicant: IGT, Las Vegas, NV (US)

(72) Inventors: Fei Ma, Beijing (CN); Haipeng Wang, Beijing (CN); Naibin Song, Beijing (CN); Yang Liu, Beijing (CN); Sarina Bao, Beijing (CN); Xuan Wei, Beijing (CN)

(73) Assignee: IGT, Las Vegas, NV (US)

( * ) Notice: Subject to any disclaimer, the term of this patent is extended or adjusted under 35 U.S.C. 154(b) by 185 days.

(21) Appl. No.: 16/405,628

(22) Filed: May 7, 2019

(65) Prior Publication Data

US 2020/0357233 A1 Nov. 12, 2020

(51) Int. Cl.
*G07F 17/32* (2006.01)
*G06F 16/23* (2019.01)
*G06Q 30/02* (2012.01)

(52) U.S. Cl.
CPC ...... *G07F 17/3241* (2013.01); *G06F 16/2379* (2019.01); *G07F 17/3239* (2013.01); *G06Q 30/0226* (2013.01)

(58) Field of Classification Search
None
See application file for complete search history.

(56) References Cited

U.S. PATENT DOCUMENTS

| | | | | |
|---|---|---|---|---|
| 2009/0191962 A1* | 7/2009 | Hardy | ............... | G07F 17/3239 463/29 |
| 2015/0312517 A1* | 10/2015 | Hoyt | ............... | G11B 27/19 386/226 |
| 2020/0066072 A1* | 2/2020 | Galvez | ............... | H04L 9/0637 |
| 2020/0162236 A1* | 5/2020 | Miller | ............... | G06F 16/2379 |

* cited by examiner

*Primary Examiner* — James S. McClellan
*Assistant Examiner* — Peter J Iannuzzi
(74) *Attorney, Agent, or Firm* — Sage Patent Group (57) ABSTRACT

A gaming system, computer-implemented method and gaming device are operable to determine player identification data corresponding to a player in a property corresponding to a selected one of multiple gaming operator nodes, compare the player identification data with each of multiple data blocks in a block chain to determine a match between the player identification data and one of the data blocks, and responsive determining that the player identification data matches one of the data blocks, send an alarm signal to a gaming operator that corresponds to the selected one of the gaming operator nodes.

19 Claims, 9 Drawing Sheets

디텍팅 EXCLUDED PLAYERS AND RELATED SYSTEMS AND METHODS

DETECTING EXCLUDED PLAYERS AND RELATED SYSTEMS AND METHODS

BACKGROUND OF THE DISCLOSURE

Casinos may be favored targets for players seeking to gain advantage by cheating at games of chance. Significant efforts may be exercised to detect player that are cheating or trying to cheat. In response to detecting a cheating player, a casino may record information corresponding to the cheating player. Such information may be used to exclude a cheating player from future opportunities to play or cheat in the casino. In this regard, many casinos have a local system to record and detect excluded players. Further, some jurisdictions may have a system for providing a local excluded player's list. However, such systems may be unable to detect excluded players playing in casinos in other jurisdictions.

BRIEF SUMMARY OF THE DISCLOSURE

According to some embodiments, a system includes a communication interface, a processor circuit and a memory coupled to the processor circuit. The memory includes machine readable instructions that, when executed by the processor circuit, cause the processor circuit to determine player identification data corresponding to a player in a property corresponding to a selected one of multiple gaming operator nodes, compare the player identification data with each of multiple data blocks in a block chain to determine a match between the player identification data and one of the data blocks, and responsive determining that the player identification data matches one of the data blocks, send an alarm signal to a gaming operator that corresponds to the selected one of the gaming operator nodes.

Embodiments are directed to methods that perform operations including receiving, by a gaming operator node of multiple gaming operator nodes, player identification data corresponding to a player in a property corresponding to the gaming operator node. Operations include generating hashed player identification data using a given hash code and/or algorithm that is applied to the player identification data and determining if the hashed player identification data matches any of multiple data blocks in a block chain that is stored by all of the gaming operator nodes. Each of the data blocks corresponds to a person on an excluded person list.

Embodiments are directed to a system that includes multiple gaming operator nodes that each access a block chain of excluded players. The block chain includes multiple data blocks that each correspond to an excluded player. Each of the gaming operator nodes includes a communication interface, a processor circuit and a memory coupled to the processor circuit. The memory includes machine readable instructions that, when executed by the processor circuit, cause the processor circuit to submit new excluded player data for inclusion into the block chain as a new data block and, responsive to the new excluded player data satisfying a consensus mechanism, upload the new excluded player data to the block chain.

DETAILED DESCRIPTION OF THE DISCLOSURE

Embodiments herein are directed to various systems, devices and methods to solve the problem of sharing and detecting excluded players. In this manner, a technical solution to the problem of detecting excluded players in a casino is provided. As used herein, the term "casino" may include an organization, premises, property and/or structure that may provide real and/or virtual gaming features, devices, systems and/or opportunities for players to participate in gaming activities. In some embodiments, a decentralized management system is provided that may be able to share the excluded players among multiple different casinos, prevent the list from being tampered with, update the list, and quickly use the list to detect excluded an excluded player.

Systems and methods disclosed herein may provide that a casino generates data corresponding to an excluded player. Data may include personally identifiable information, information about specific products or services in which an excluded player may be enrolled, statistical information about the excluded player, biographical information of the excluded player, biometric information of the excluded player, and the like. For example, data may include any of the following information for each excluded player, if acquired and recorded: legal name, maiden name, aliases, physical address(es), email address(es), telephone numbers, financial account names, financial account numbers, social security number, driver's license number, height, hair color, eye color, age, birthdate, spouse or other family information, biometric information, previous addresses, previous financial accounts or financial products, and the like.

A casino management system may detect excluded player data to determine if the excluded player data meets a consensus mechanism, such as a Practical Byzantine Fault Tolerance (PBFT) mechanism. If the excluded player data meets the consensus mechanism, then the shared data may be uploaded to a consortium block chain. In some embodiments, the consortium may be a group of casino and/or other gaming venue operators that agree to specific terms for accessing, using and/or submitting to the block chain corresponding to excluded players. If the excluded player data does not meet the consensus mechanism, then the data is not uploaded. Other casinos in the consortium may synchronize the shared data to a casino management system locally for detecting and identifying excluded players.

Figure 1:
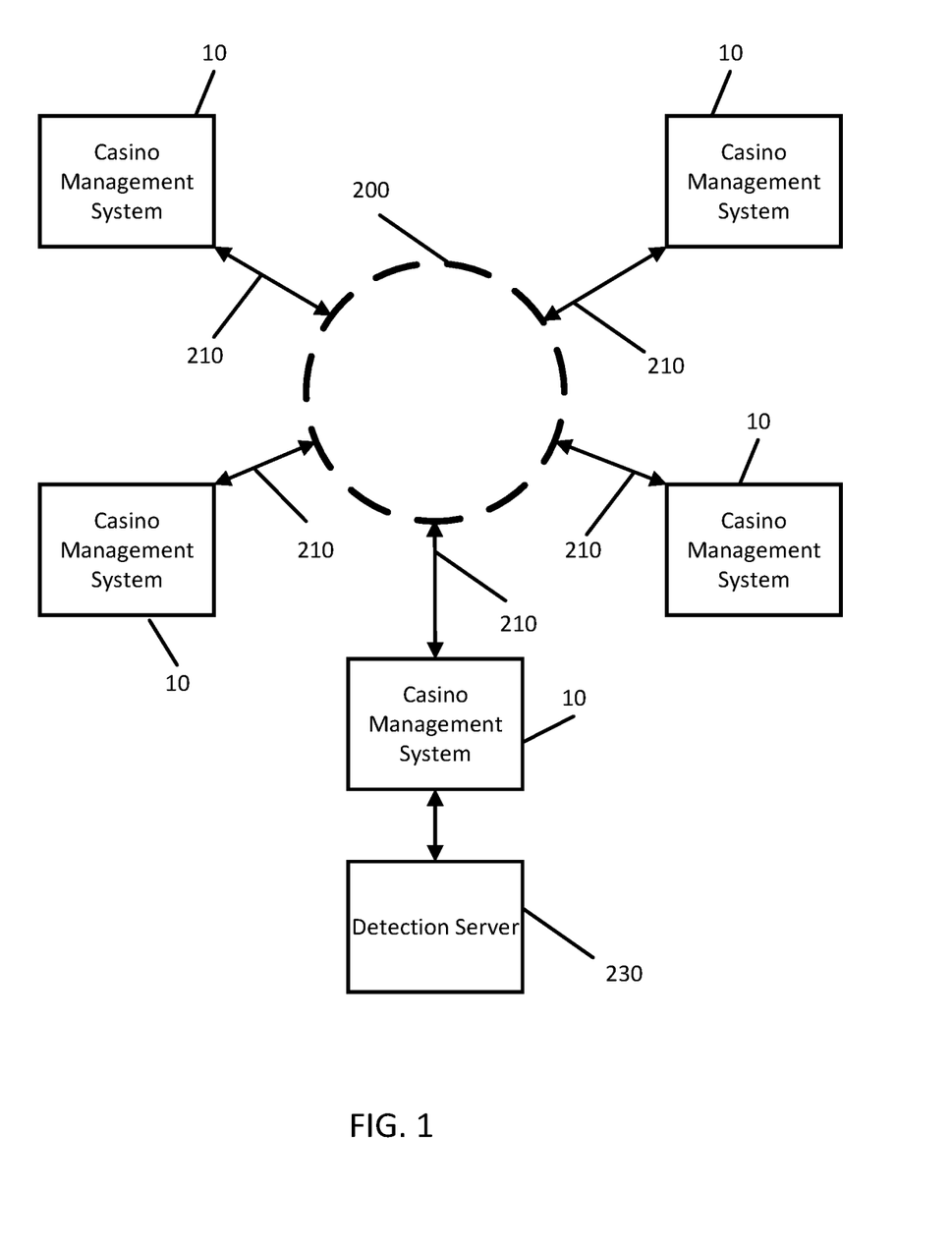
FIG. 1 is a schematic block diagram illustrating a system architecture according to some embodiments herein.

Reference is now made to FIG. 1, which is a schematic block diagram illustrating a system architecture according to some embodiments herein. Each of the multiple different casinos may include a casino management system 10 that may have access to a decentralized data source that is provided as a block chain 200. The block chain 200 may include multiple different data blocks that each correspond to a different excluded player. In some embodiments, each casino management system 10 may store or cause to be stored an instance of the block chain 200, which may include a communication channel 210 to the block chain 200. In this manner, each casino management system may be communicatively coupled, directly and/or indirectly, to every other casino management system in the consortium. Although not illustrated in this figure, some embodiments provide that intervening networks may be included in the communication channel 210. Updated and/or new excluded player data may be uploaded via the communication channel 210 to the block chain 200 based on consensus that the update and/or new excluded player data meets a consensus requirement.

Data corresponding to the block chain 200 may be used by receiving player data through server, such as, a detection server 230. The detection server 230 may receive player data and analyze the player data to determine if the player data corresponds to an excluded player that is identified in the block chain 200. Although illustrated as a separate server, the detection server 230 may be within the casino management system 10.

Figure 2:
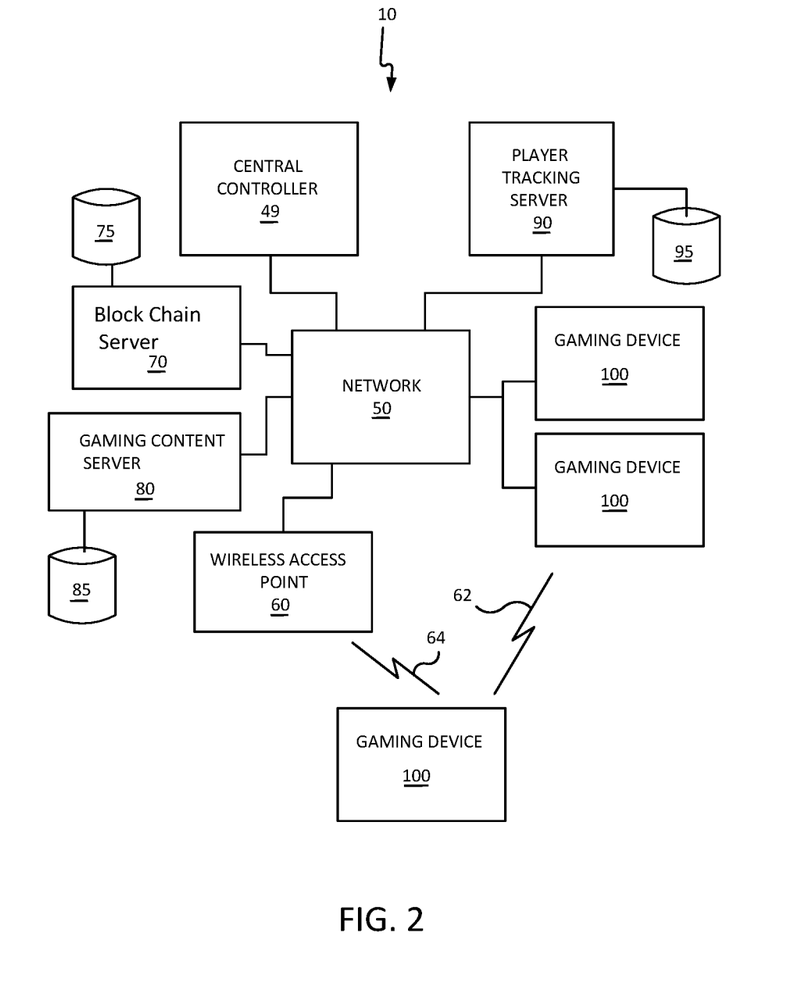
FIG. 2 illustrates a casino management system including a plurality of gaming devices according to some embodiments herein.

Reference is now made to FIG. 2, which illustrates a casino management system 10 including a plurality of gaming devices 100. The casino management system 10 may be located, for example, on the premises of a gaming establishment, such as a casino, in a private residence, or may include components that are located at different locations. The gaming devices 100 may be in communication with each other and/or a central controller 49 through a data communication network 50, or remote communication link. The data communication network 50 may be a private data communication network that is operated, for example, by the gaming facility that operates the gaming device 100, a publicly accessible data communication network such as the Internet, or a combination thereof. Communications over the data communication network 50 may be encrypted for security. The central controller 49 may be any suitable server or computing device which includes at least one processor circuit, such as a processor, and at least one memory or storage device. Each gaming device 100 may include a processor circuit that transmits and receives events, messages, commands or any other suitable data or signal between the gaming device 100 and the central controller 49 and/or other gaming devices 100. The gaming device processor is operable to execute such communicated events, messages or commands in conjunction with the operation of the gaming device 100. Moreover, the processor of the central controller 49 is configured to transmit and receive events, messages, commands or any other suitable data or signal between the central controller 49 and each of the individual gaming devices 100. In some embodiments, one or more of the functions of the central controller 49 may be performed by one or more gaming device processors. Moreover, in some embodiments, one or more of the functions of one or more gaming device processors as disclosed herein may be performed by the central controller 49.

A wireless access point 60 provides wireless access to the data communication network 50. The wireless access point 60 may be connected to the data communication network 50 as illustrated in FIG. 2, or may be connected directly to the central controller 49 or another server connected to the data communication network 50.

One or more content servers, such as a gaming content server 80, may also be connected through the data communication network 50. Similarly, the gaming content server 80 may manage delivery of the gaming content to the user of a gaming device 100. The gaming content may be stored in a gaming content database 85. A block chain server 70 may manage access, update, storage, consensus determination, and/or excluded player identification corresponding to the consortium block chain 200. The block chain data may be stored in a block chain database 75. The block chain server 70 and a gaming content server 80 may be implemented within or separately from each other. The block chain server 70 and a gaming content server 80 may also be implemented within or separately from the central controller 49.

A player tracking server 90 may also be connected through the data communication network 50. The player tracking server 90 may manage a player tracking account that tracks the gameplay and spending and/or other player preferences and customizations of a player, i.e., the user of the gaming device 100, manages loyalty awards for the player, manages funds deposited or advanced on behalf of the player, and other functions. Player information managed by the player tracking server 90 may be stored in a player information database 95. In some embodiments, the player information database 95 and/or the player tracking server 90 may include and/or provide information that may be used by the block chain server 70 to detect excluded players. For example, data corresponding to an excluded player may be received responsive to the excluded player submitting and/or inserting a player tracking card to a gaming table or machine.

The gaming devices 100 communicate with one or more elements of the system 10 to coordinate providing streaming video content and synchronized gaming content. For example, in some embodiments, a gaming device 100 may communicate directly with another gaming device 100 over a wireless interface 62, which may be a WiFi link, a Bluetooth link, an NFC link, etc. In other embodiments, the gaming device 100 may communicate with the data communication network 50 (and devices connected thereto, including EGMs) over a wireless interface 64 with the wireless access point 60. The wireless interface 64 may include a WiFi link, a Bluetooth link, an NFC link, etc. In still further embodiments, the gaming device 100 may communicate with other gaming devices 100 or other devices over the wireless interface 62 and the wireless access point 60 over the wireless interface 64. In these embodiments, the wireless interface 62 and the wireless interface 64 may use different communication protocols and/or different communication resources, such as different frequencies, time slots, spreading codes, etc. For example, in some embodiments, the wireless interface 62 may be a Bluetooth link, while the wireless interface 64 may be a WiFi link.

The wireless interfaces 62, 64 allow the gaming devices 100 and/or central controller 49 to coordinate providing player data from gaming devices 100.

Figure 3:
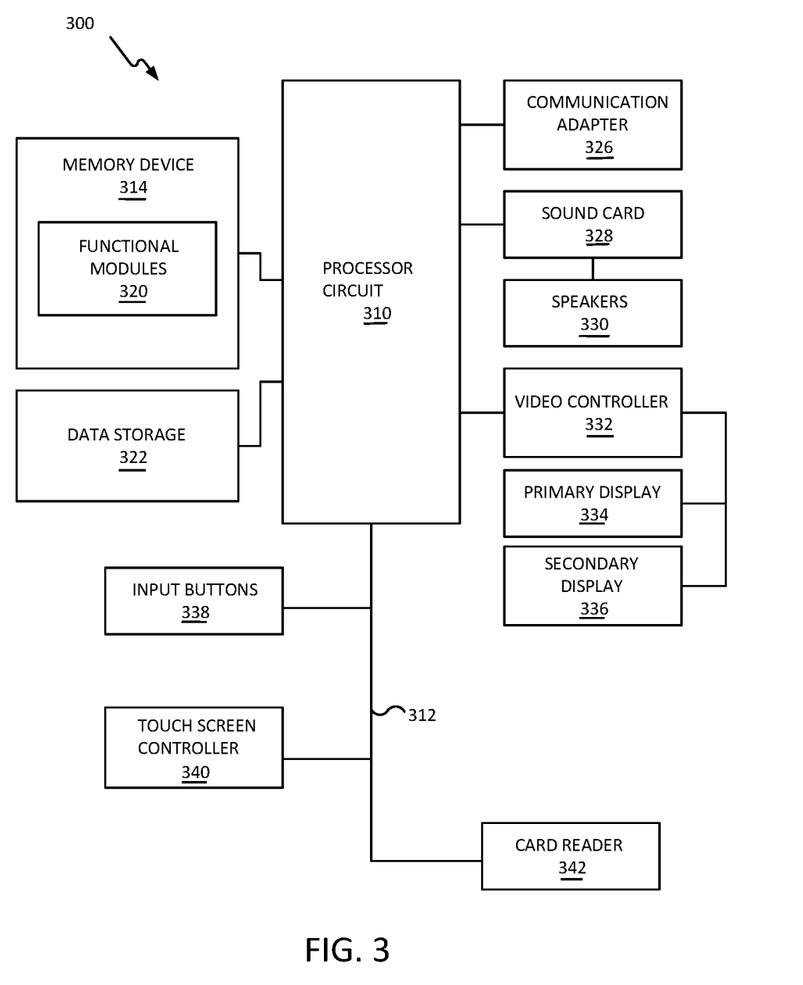
FIG. 3 is a block diagram that illustrates various components of a computing device 300, which may embody or be included as part of the devices, systems, and/or components above, according to some embodiments.

Reference is now to FIG. 3, which is a block diagram that illustrates various components of a computing device 300, which may embody or be included as part of the devices, systems, and/or components above, according to some embodiments. As shown in FIG. 3, the computing device 300 may include a processor circuit 310 that controls operations of the computing device 300. Although illustrated as a single processor, multiple special purpose and/or general-purpose processors and/or processor cores may be provided in the computing device 300. For example, the computing device 300 may include one or more of a video processor, a signal processor, a sound processor and/or a communication controller that performs one or more control functions within the computing device 300. The processor circuit 310 may be variously referred to as a "controller," "microcontroller," "microprocessor" or simply a "computer." The processor circuit 310 may further include one or more application-specific integrated circuits (ASICs).

Various components of the computing device 300 are illustrated in FIG. 3 as being connected to the processor circuit 310. It will be appreciated that the components may be connected to the processor circuit 310 and/or each other through one or more buses 312 including a system bus, a communication bus and controller, such as a USB controller and USB bus, a network interface, or any other suitable type of connection.

The computing device 300 further includes a memory device 314 that stores one or more functional modules 320 for performing the operations described above. Alternatively, or in addition, some of the operations described above may be performed by other devices connected to the network, such as the network 50 of the system 10 of FIG. 2, for example. The computing device 300 may communicate with other devices connected to the network to facilitate performance of some of these operations. For example, the computing device 300 may communicate and coordinate with certain displays to identify elements of a race being displayed by a particular display.

The memory device 314 may store program code and instructions, executable by the processor circuit 310, to control the computing device 300. The memory device 314 may include random access memory (RAM), which can include non-volatile RAM (NVRAM), magnetic RAM (ARAM), ferroelectric RAM (FeRAM) and other forms as commonly understood in the gaming industry. In some embodiments, the memory device 314 may include read only memory (ROM). In some embodiments, the memory device 314 may include flash memory and/or EEPROM (electrically erasable programmable read only memory). Any other suitable magnetic, optical and/or semiconductor memory may operate in conjunction with the gaming device disclosed herein.

The computing device 300 may include a communication adapter 326 that enables the computing device 300 to communicate with remote devices, such as the wireless network, another computing device 300, and/or a wireless access point, over a wired and/or wireless communication network, such as a local area network (LAN), wide area network (WAN), cellular communication network, or other data communication network, e.g., the network 50 of FIG. 2.

The computing device 300 may include one or more internal or external communication ports that enable the processor circuit 310 to communicate with and to operate with internal or external peripheral devices, such as a sound card 328 and speakers 330, video controllers 332, a primary display 334, a secondary display 336, input buttons 338 or other devices such as switches, keyboards, pointer devices, and/or keypads, a touch screen controller 340, a card reader 342, currency acceptors and/or dispensers, cameras, sensors such as motion sensors, mass storage devices, microphones, haptic feedback devices, and/or wireless communication devices. In some embodiments, internal or external peripheral devices may communicate with the processor through a universal serial bus (USB) hub (not shown) connected to the processor circuit 310. Although illustrated as being integrated with the computing device 300, any of the components therein may be external to the computing device 300 and may be communicatively coupled thereto. Although not illustrated, the computing device 300 may further include a rechargeable and/or replaceable power device and/or power connection to a main power supply, such as a building power supply.

In some embodiments, the computing device 300 may include a head mounted device (HMD) and may include optional wearable add-ons that include one or more sensors and/or actuators. Including ones of those discussed herein. The computing device 300 may be a head-mounted mixed-reality device configured to provide mixed reality elements as part of a real-world scene being viewed by the user wearing the computing device 300.

Figure 4:
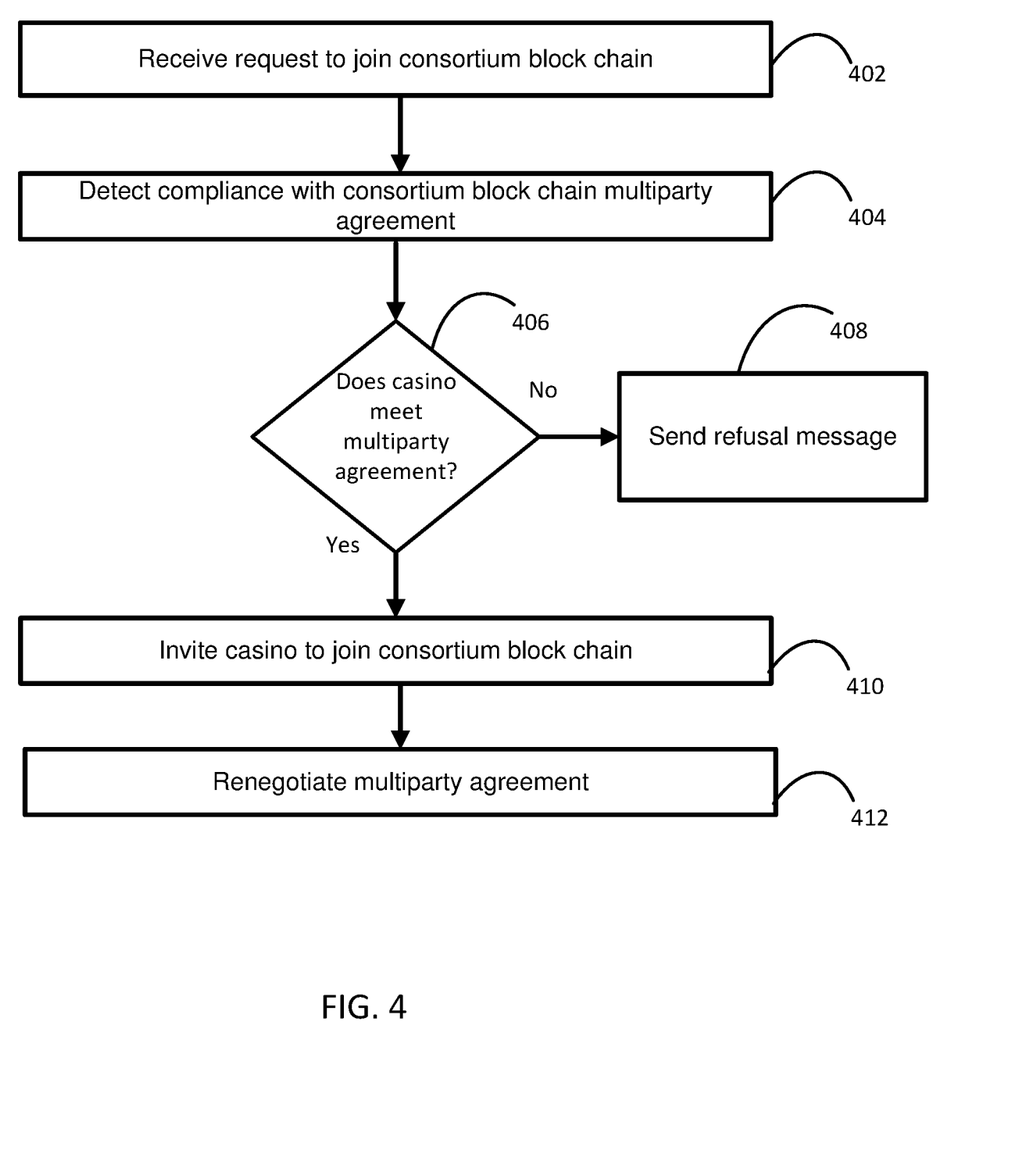
FIG. 4 is a schematic flow diagram illustrating operations for system permission of casinos and/or other gaming venue operators in the consortium block chain according to some embodiments.

Reference is now made to FIG. 4, which is a schematic flow diagram illustrating operations for system permission of casinos and/or other gaming venue operators in the consortium block chain according to some embodiments. Some embodiments include receiving a request to join the consortium block chain (block 402). Prior to receiving the request, a casino system management node may generate the consortium block chain. Some embodiments provide that the system is decentralized, the consortium block chain may be generated by a gaming operator node. Requests to join the consortium block chain may be evaluated by detecting compliance with the consortium block chain multiparty agreement (block 404). Detecting compliance may include coordinating organization changes between multiple parties and identifying mechanisms for adding data blocks in the block chain based on the multiparty agreement. A determination is made as to whether the casino meets the requirements of multiparty agreement (block 406). The requirements may include definitions of processes, thresholds, protocols, access policies, security procedures, and/or equipment standards, among others. If the casino meets the terms of the multiparty agreement, then the casino may be invited to join the consortium block chain (block 410). In contrast, if the casino does not meet the terms of the multiparty agreement, then a refusal message may be sent (block 408).

As provided herein, the multiparty agreement may further identify which hierarchies, if any, a new data resource should be added to and the location within the hierarchy that the resource data resource should be added. In some embodiments, organization changes between multiple parties may be defined including mechanisms to approve a change to the organization. For example, the multiparty agreement may define an authenticated 2-way handshake mechanism to confirm or deny a potential change to an organization. Further mechanisms defined for multiparty agreements may include emailed invitations, single use tokens, and/or shared secrets (domains/passwords), among others.

In some embodiments, once a requesting casino is invited to join the consortium block chain, the multiparty agreement may be renegotiated and/or re-executed to include data corresponding to a new consortium block chain member (block 412).

Figure 5:
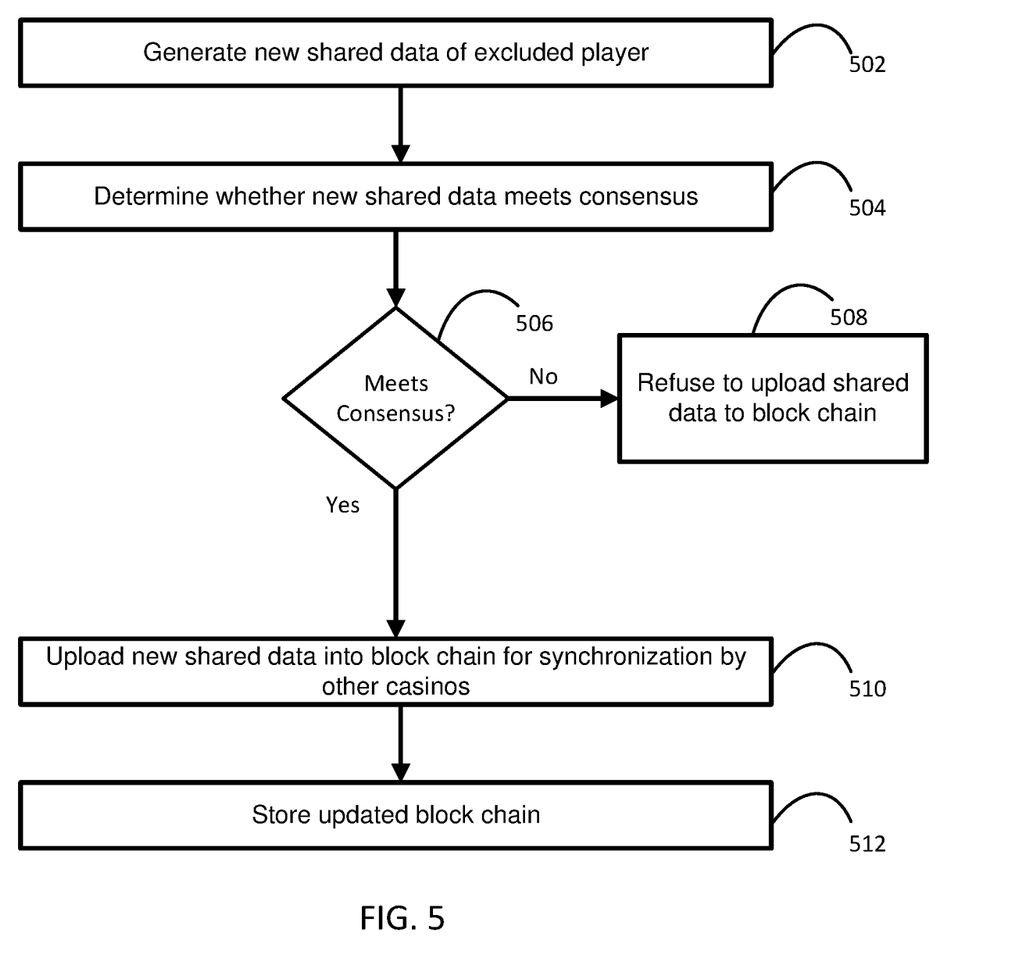
FIG. 5 is a schematic flow diagram illustrating operations of a system for creating and synchronizing shared excluded player data according to some embodiments.

Reference is now made to FIG. 5, which is a schematic flow diagram illustrating operations of a system for creating and synchronizing shared excluded player data according to some embodiments. Operations include generating new shared data corresponding to an excluded player (block 502). For example, a casino may be a consortium block chain member operating as node in a system for detecting excluded players may identify a player as a cheating player that should be excluded from future casino play.

In such embodiments, it is determined whether the new shared data meets a consensus (block 504). In a block chain configuration, there are varying consensus algorithms that can be used. For example, a private block chain may choose an algorithm such as Practical Byzantine Fault Tolerance (PBFT). The PBFT mechanism may be useful for small networks, such as networks having fewer than about 100 nodes. Other examples include a Proof of Work (PoW) consensus algorithm and/or a Proof of Stake (PoS) consensus algorithm, which may be used as the value of an underlying data block and/or value changes.

If the new shared data of the excluded player does not meet the consensus (block 506), then the operations may include refusing to upload the shared data to the block chain. Some embodiments provide that feedback data is sent to the consortium block chain member that submitted the new shared data. In some embodiments, the feedback data may identify a portion of the new shared data that was the basis for the new shared data not meeting the consensus mechanism. In some embodiments, the consensus may be based on the approval of a percentage of all of the consortium block chain members. For example, some embodiments provide that at least thirty percent of the consortium block chain members must evaluate the new shared data and determine that the new shared data meets the consensus mechanism. Some embodiments provide that more or less than thirty percent of the consortium block chain members must evaluate the new shared data and determine that the new shared data meets the consensus mechanism If the new shared data of the excluded player does meet the consensus (block 506), then the new shared data is uploaded into the block chain for synchronization by other casinos (block 510). Some embodiments provide that every time a change is made to the block chain, the block chain is synchronized by and/or sent to each consortium block chain member. Some embodiments provide that every time a change is made to the block chain, the change is sent to each for the consortium block chain members to synchronize their own instances of the block chain. In either circumstance, the updated block chain may be stored in a data repository that is local to the casino and/or consortium block chain member's venue (block 512). In this manner, the most updated version of the block chain may be decentralized and locally available for use by consortium block chain members.

Figure 6:
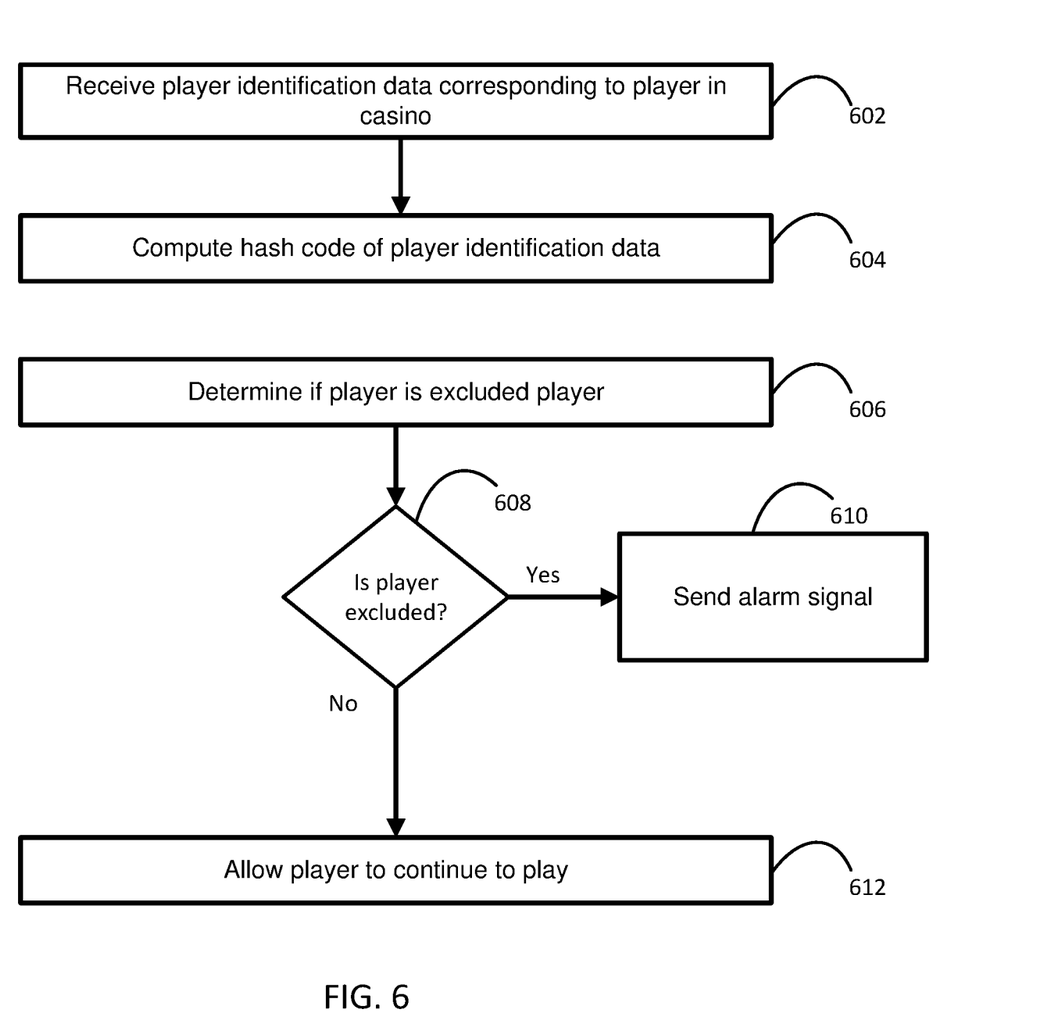
FIG. 6 is a schematic flow diagram illustrating operations of a system for utilizing the block chain to detect excluded players according to some embodiments.

Reference is now made to FIG. 6, which is a schematic flow diagram illustrating operations of a system for utilizing the block chain to detect excluded players according to some embodiments. Operations include receiving player identification data that corresponds to a player in a casino (block 602). In some embodiments, the player identification data is received responsive to the player providing a player loyalty card to a casino operator or equipment. The player loyalty card may include data that identifies the player to the casino. In some embodiments, the player may be identified by the casino management system using other technologies including, for example, facial recognition and/or gait recognition, among others. Some embodiments provide that a player identification may be determined from the player using non-cash payment methods for paying for goods and/or services within the casino.

Some embodiments provide that the player has a player identification number that may be assigned by the casino and/or may correspond to a government issued identification. Once the player is identified, the casino management system may compute a hash code of the player identification number using the same hashing algorithm that excluded player data is hashed in the block chain (block 604). The casino management system then determines if the hashed player identification number matches any of the excluded players in the block chain (block 606). For example, the hashed player identification number may be compared to hashed identification numbers that are in the block chain and that correspond to excluded players.

If the player is determined to be an excluded player that is identified in the block chain (block 608), then an alarm signal may be sent to casino personnel and/or systems (block 610). If the player is determined not to be an excluded player that is identified in the block chain (block 608), then the player may be allowed to continue to play (block 612).

Figure 7:
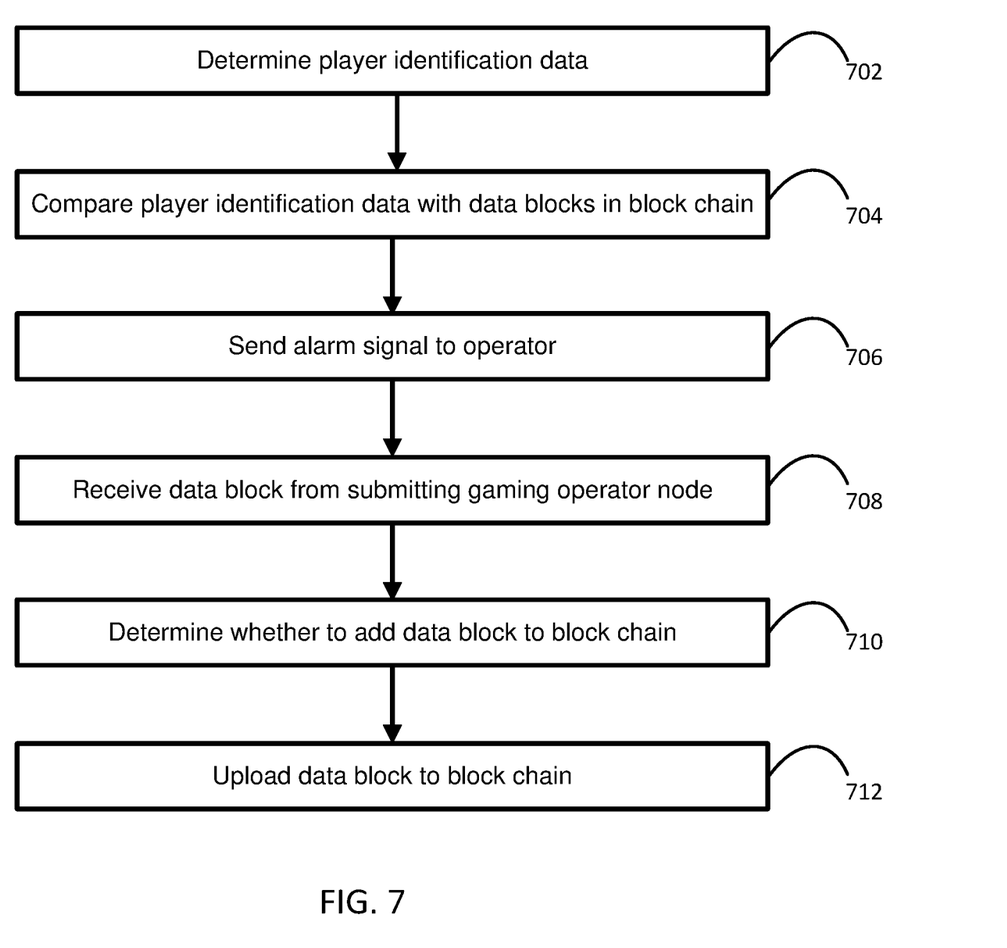
FIG. 7 is a flowchart illustrating operations of systems/methods according to some embodiments.

Reference is now made to FIG. 7, which is a schematic flow diagram illustrating operations of systems and methods according to some embodiments. Operations may include determining player identification data corresponding to a player in a property (block 702). In some embodiments, the player identification data may be determined using a player specific loyalty card that is received from the player.

In some embodiments, the property may correspond to a selected one of multiple gaming operator nodes. In some embodiments, gaming operator nodes include a consortium that accesses a block chain of data corresponding to excluded players.

In some embodiments, operations include receiving a request corresponding to a non-member of the consortium, detecting whether the non-member satisfies a multi-party block chain agreement, and responsive to the non-member satisfying the multi-party block chain agreement, adding the non-member to the consortium. Some embodiments provide that, responsive to the non-member not satisfying the multi-party block chain agreement, denying the non-member access to the block chain.

Operations may include comparing the player identification data with each of multiple data blocks that are in a block chain to determine a match between the player identification data and one of the data blocks (block 704). In some embodiments, each data block includes a hashcode of player identification data of each one of multiple excluded persons. Excluded persons may include players that are excluded based on previous unwanted behaviors, skills, and/or activities at a casino. Non-limiting examples of unwanted behaviors, skills, and/or activities include cheating, attempts at cheating, theft, fraud, disruption and/or any other unwanted conduct. Some embodiments provide that before the player identification data is compared to the data blocks in the block chain, a hashing operation of the player identification data is performed on the player identification data using the same hashcode and/or same hashing algorithm that is used in the data blocks in the block chain.

In response to determining that the player identification data matches one of the data blocks in the block chain, an alarm signal may be sent to a gaming operator that corresponds to the associated one of the gaming operator nodes (block 706). Some embodiments provide that the alarm signal includes player identification data corresponding to the player in the property being identified as one of the excluded persons.

Operations may include receiving, via the communication interface and from a submitting gaming operator node that is one of the gaming operator nodes, a first data block that corresponds to an identity of an excluded person (block 708). Some embodiments provide that operations include determining whether to add the first data block to the block chain (block 710). The block chain may include multiple data blocks that each correspond to a different excluded person. In some embodiments, determining whether to add the first data block to the block chain includes evaluating the first data block based on a consensus mechanism that determines agreement level corresponding to the first data block. Some embodiments provide that the gaming operator nodes include a consortium that accesses the block chain and that the consensus mechanism includes approval corresponding to a percentage of a quantity of the gaming operator nodes. For example, some embodiments require that thirty percent of the gaming operator nodes approve of adding the first data block to the block chain to meet the consensus mechanism. Some other embodiments require more or less than thirty percent of the gaming operator nodes to approve of adding the first data block to the block chain to meet the consensus mechanism.

In some embodiments, the consensus mechanism includes a Practical Byzantine Fault Tolerance mechanism. Some embodiments provide that, responsive to determining that the first data block satisfies the consensus mechanism, uploading the first data block into the block chain (block 712). Once the first data block is uploaded into the block chain, a synchronization of all of the gaming operator nodes may be performed to include the first data block in the block chain and cause the block chain to be stored at each of the gaming operator nodes.

In some embodiments, in response to determining that the first data block does not satisfy the consensus mechanism, a failed consensus message is sent to the submitting gaming operator node.

Figure 8:
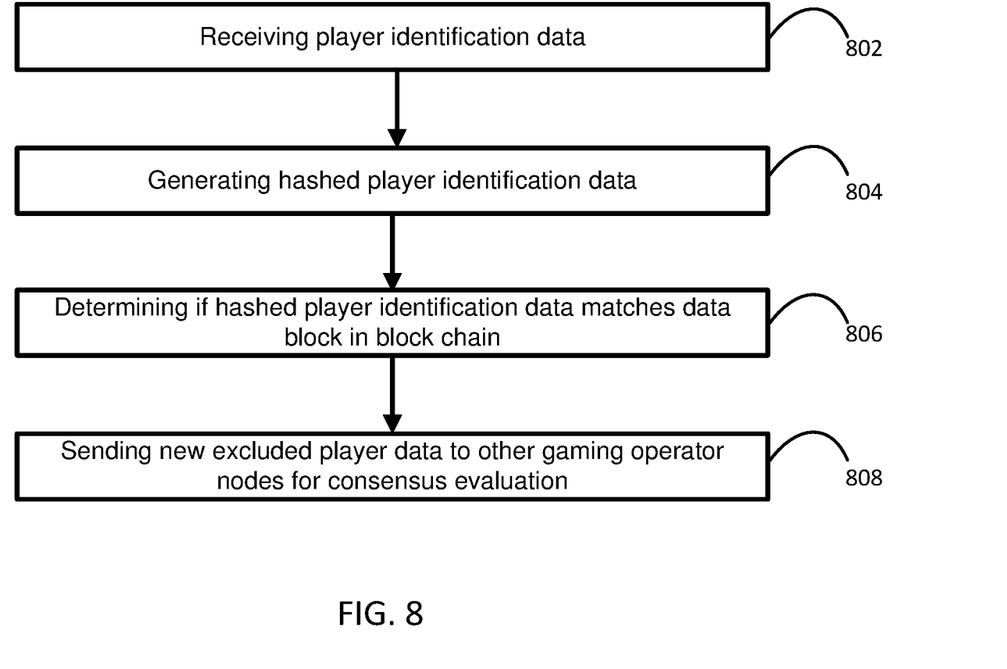
FIG. 8 is a flowchart illustrating operations of systems/methods according to some embodiments.

Reference is now made to FIG. 8, which is a schematic flow diagram illustrating operations of systems and methods according to some embodiments. Operations may include receiving, by a gaming operator node of multiple gaming operator nodes, player identification data corresponding to a player (block 802). In some embodiments, the player is in a property corresponding to the gaming operator node.

Operations include generating hashed player identification data (block 804). Some embodiments provide that the hashed player identification data is generated using a given hash code that is applied to the player identification data.

Operations include determining if the hashed player identification data matches any data blocks in a block chain (block 806). In some embodiments, the block chain is stored by each the gaming operator nodes. Some embodiments provide that each of the data blocks in the block chain corresponds to a person on an excluded person list.

In response to determining that the player identification data matches one of the data blocks in the block chain, an alarm signal may be sent to a gaming operator that corresponds to the gaming operator node. Some embodiments include sending, to other ones of the gaming operator nodes, new excluded player data for evaluation regarding a consensus mechanism (block 808). In some embodiments, responsive to satisfying the consensus mechanism, the new excluded player data is uploaded as a new data block in the block chain. In some embodiments, the other gaming operator nodes may synchronize to include the new data block into the block chain that is stored locally.

In response to uploading the new excluded player data as the new data block in the block chain, operations may include analyzing player identification data corresponding to currently active players that are currently on the property corresponding to the gaming operator node. In some embodiments, the player identification data includes facial and/or gait recognition data. Some embodiments provide that the gaming operator nodes each store the block chain locally.

Figure 9:
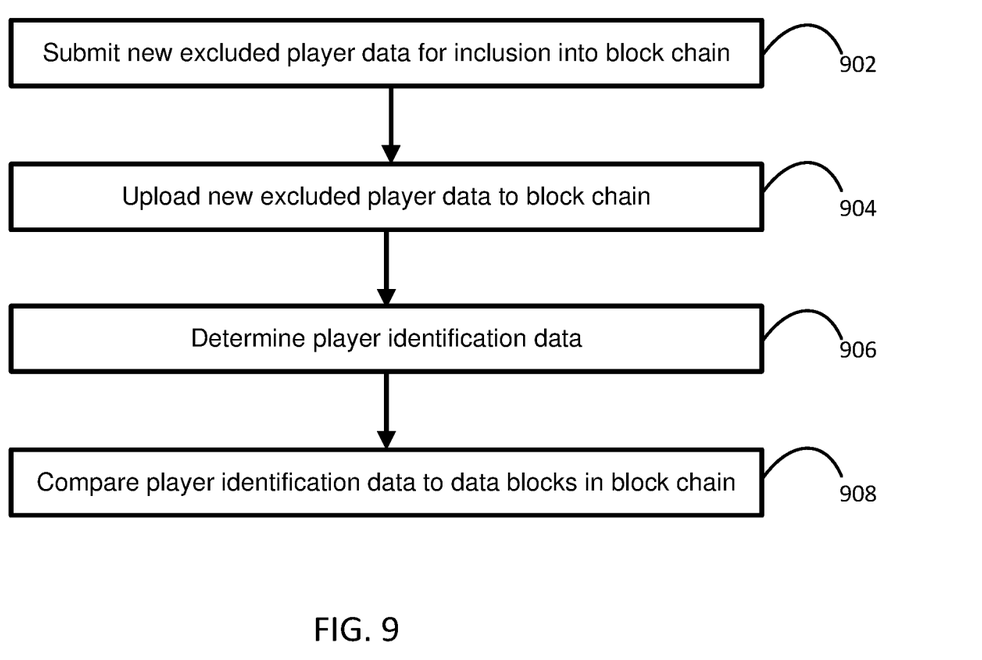
FIG. 9 is a schematic block diagram illustrating various components of a computing device according to some embodiments.

Reference is now made to FIG. 9, which is a schematic flow diagram illustrating operations of systems and methods according to some embodiments. Operations include submitting new excluded player data for inclusion into the block chain as a new data block (block 902). In response to the new excluded player data satisfying a consensus mechanism, uploading the new excluded player data to the block chain (block 904). Operations include determining player identification data corresponding to a player in a property corresponding to the gaming operator node (block 906) and comparing the player identification data to data blocks in the block chain (block 908).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks. The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system comprising:
   a communication interface;
   a processor circuit; and
   a memory coupled to the processor circuit, the memory comprising machine readable instructions that, when executed by the processor circuit, cause the processor circuit to:
   determine player identification data corresponding to a player in a property corresponding to a selected one of a plurality of gaming operator nodes;
   compare the player identification data with each of a plurality of data blocks in a block chain to determine a match between the player identification data and one of the plurality of data blocks; and
   responsive determining that the player identification data matches one of the plurality of data blocks, send an alarm signal to a gaming operator that corresponds to the selected one of the plurality of gaming operator nodes,
   wherein the plurality of gaming operator nodes comprises a consortium that accesses the block chain,
   wherein the processor circuit further:
   receives a request corresponding to a non-member of the consortium;
   detects whether the non-member satisfies a multi-party block chain agreement;
   responsive to the non-member satisfying the multi-party block chain agreement, adds the non-member to the consortium; and
   responsive to the non-member not satisfying the multi-party block chain agreement, denies the non-member access to the block chain.

2. The system of claim 1, wherein the processor circuit further receives, via the communication interface and from a submitting gaming operator node that is one of the plurality of gaming operator nodes, a first data block, the first data block corresponding to an identity of an excluded person.

3. The system of claim 2, wherein the processor circuit further determines whether to add the first data block to the block chain that comprises the plurality of data blocks, each of the plurality of data blocks corresponding to a different excluded person.

4. The system of claim 3, wherein instructions that cause the processor circuit to determine whether to add the first data block to the block chain cause the processor circuit to evaluate the first data block based on a consensus mechanism that determines agreement level corresponding to the first data block.

5. The system of claim 4, wherein the plurality of gaming operator nodes comprises a consortium that accesses the block chain, and
wherein the consensus mechanism comprises approval corresponding to a percentage of a quantity of the plurality of gaming operator nodes.

6. The system of claim 4, wherein the consensus mechanism comprises a Practical Byzantine Fault Tolerance mechanism.

7. The system of claim 6, wherein responsive to determining that the first data block satisfies the consensus mechanism, the processor circuit further uploads the first data block into the block chain which results in a synchronization of all of the plurality of gaming operator nodes to comprise the first data block and causing the block chain to be stored at each of the plurality of gaming operator nodes.

8. The system of claim 4, wherein responsive to determining that the first data block does not satisfy the consensus mechanism, the processor circuit refuses the first data block, and
wherein the processor circuit further sends a failed consensus message to the submitting gaming operator node.

9. The system of claim 1, wherein each data block in the plurality of data blocks comprises a hashcode of player identification data of each of a plurality of excluded persons,
wherein before the player identification data is compared to the plurality of data blocks, the processor circuit further performs a hashing operation of the player identification data using the hashcode used in the plurality of data blocks in the block chain.

10. The system of claim 1, wherein the alarm signal comprises player identification data corresponding to the player in the property being identified as one of a plurality of excluded persons.

11. The system of claim 1, wherein causing the processor circuit to determine player identification data corresponding to the player in the property causes the processor circuit to determine the player identification data using a player specific loyalty card that is received from the player.

12. A method comprising:
receiving, by a gaming operator node of a plurality of gaming operator nodes, player identification data corresponding to a player in a property corresponding to the gaming operator node;
generating hashed player identification data using a given hash code that is applied to the player identification data;
determining if the hashed player identification data matches any of a plurality of data blocks in a block chain that is stored by all of the plurality of gaming operator nodes, wherein each of the plurality of data blocks corresponds to a person on an excluded person list; and
executing a multi-party block chain agreement to be a member of a consortium that comprises the plurality of gaming operator nodes.

13. The method of claim 12, wherein responsive to determining that the player identification data matches one of the plurality of data blocks, sending an alarm signal to a gaming operator that corresponds to the gaming operator node.

14. The method of claim 12, further comprising sending, to other ones of the plurality of gaming operator nodes, new excluded player data for evaluation regarding a consensus mechanism, wherein responsive to satisfying the consensus mechanism, uploading the new excluded player data as a new data block in the block chain and causing other ones of the plurality of gaming operator nodes to synchronize to comprise the new data block into the block chain.

15. The method of claim 14, wherein responsive to uploading the new excluded player data as the new data block in the block chain, the method further comprises analyzing player identification data corresponding to currently active players that are currently on the property corresponding to the gaming operator node.

16. The method of claim 15, wherein the player identification data comprises facial recognition data.

17. The method of claim 12, wherein ones of the plurality of gaming operator nodes each store the block chain locally.

18. A system comprising:
a plurality of gaming operator nodes that each access a block chain of excluded players,
wherein the block chain comprises a plurality of data blocks that each corresponds to an excluded player, and
wherein each of the plurality of gaming operator nodes comprises:
a communication interface;
a processor circuit; and
a memory coupled to the processor circuit, the memory comprising machine readable instructions that, when executed by the processor circuit, cause the processor circuit to:
submit new excluded player data for inclusion into the block chain as a new data block, and responsive to the new excluded player data satisfying a consensus mechanism, upload the new excluded player data to the block chain,
wherein the plurality of gaming operator nodes comprises a consortium of gaming operators that accesses the block chain.

19. The system of claim 18, wherein the processor circuit in each of the plurality of gaming operator nodes is further caused to:
determine player identification data corresponding to a player in a property corresponding to the gaming operator node, and
compare the player identification data to data blocks in the block chain.

* * * * *